US008959881B2

(12) United States Patent
Barnett et al.

(10) Patent No.: US 8,959,881 B2
(45) Date of Patent: Feb. 24, 2015

(54) ROTARY DISK HEADER WITH A ROLLER FOR TRANSFERRING THE CROP SUPPORTED BY A CENTER BEARING

(71) Applicant: MacDon Industries Ltd, Winnipeg (CA)

(72) Inventors: Neil Gordon Barnett, Winnipeg (CA); Daniel Victor Kaethler, Winnipeg (CA)

(73) Assignee: MacDon Industries Ltd., Wpg MB (CA)

( * ) Notice: Subject to any disclaimer, the term of this patent is extended or adjusted under 35 U.S.C. 154(b) by 162 days.

(21) Appl. No.: 13/846,966

(22) Filed: Mar. 19, 2013

(65) Prior Publication Data
US 2014/0283493 A1 Sep. 25, 2014

(51) Int. Cl.
*A01D 43/00* (2006.01)
*A01D 34/66* (2006.01)

(52) U.S. Cl.
CPC .................................. *A01D 34/664* (2013.01)
USPC .......................................................... 56/157

(58) Field of Classification Search
USPC ..... 56/157, 14.5, 192, 16.4 C, 16.4 A, 16.4 B
See application file for complete search history.

(56) References Cited

U.S. PATENT DOCUMENTS

| 4,896,483 | A | * | 1/1990 | O'Halloran et al. ................. 56/1 |
| 5,430,997 | A | * | 7/1995 | O'Halloran et al. ................. 56/6 |
| 5,463,852 | A | * | 11/1995 | O'Halloran et al. ................. 56/6 |
| 6,047,532 | A | * | 4/2000 | O'Halloran et al. ........ 56/16.4 A |
| 6,082,085 | A | * | 7/2000 | Stelzer et al. .................... 56/14.9 |
| 6,158,201 | A | * | 12/2000 | Pruitt et al. ........................ 56/6 |
| 6,497,087 | B1 | * | 12/2002 | Stiefvater et al. .............. 56/16.6 |
| 6,718,744 | B2 | * | 4/2004 | Rosenbalm et al. ................. 56/6 |
| 7,958,708 | B2 | * | 6/2011 | Nickel et al. ............... 56/16.4 C |
| 8,006,470 | B2 | * | 8/2011 | Pruitt et al. ................ 56/16.4 C |
| 8,069,640 | B2 | | 12/2011 | Barnett |
| 8,161,719 | B2 | * | 4/2012 | Barnett et al. ................... 56/157 |
| 8,166,736 | B2 | * | 5/2012 | Nickel et al. ............... 56/16.4 C |
| 8,220,234 | B2 | * | 7/2012 | Pruitt et al. ................ 56/16.4 C |
| 8,225,589 | B2 | * | 7/2012 | Barnett ............................ 56/157 |
| 8,286,411 | B2 | * | 10/2012 | Barnett et al. ................... 56/157 |
| 8,291,685 | B2 | * | 10/2012 | Pruit et al. ...................... 56/157 |
| 8,297,033 | B2 | * | 10/2012 | Pruit et al. ...................... 56/157 |
| 2011/0146219 | A1 | * | 6/2011 | Pruitt et al. ...................... 56/157 |

* cited by examiner

*Primary Examiner* — Árpád Fábián-Kovács
(74) *Attorney, Agent, or Firm* — Adrian D. Battison; Ade & Company Inc.

(57) ABSTRACT

A crop header has generally horizontal flail disks mounted on a cutter bar for driven rotation about generally upright axes. A pair of conditioner rolls is mounted in a discharge opening. A crop converging system includes two over-shot auger elements defined by a common rotary member with an auger flight carried thereon arranged generally longitudinal of the cutter bar so as to carry the cut crop longitudinally of the cutter bar to the entrance opening. The common rotary member includes two portions connected at a center location driven at one end and supported at the center location by a bearing and support plate connected to the cutter bar attached to one portion and a universal joint between the end of the supported portion and the other portion to allow flexing of the cutter bar to be transmitted through the universal joint.

12 Claims, 4 Drawing Sheets

ROTARY DISK HEADER WITH A ROLLER FOR TRANSFERRING THE CROP SUPPORTED BY A CENTER BEARING

This invention relates to a crop harvesting header which has a cutter bar across the width of the header which carries and drives a plurality of transversely spaced rotary disks and particularly to an improved arrangement of a transfer roller supported by a center bearing for transferring the cut crop from the disks to a discharge opening.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

One example of an arrangement of this type is shown U.S. Pat. No. 8,069,640 (Barnett) issued 6 Dec. 2011 to the present Assignees. This shows in FIGS. 8 and 10 a transfer roller for carrying the crop from the rear of the cutting disks at the cutter bar to a conditioning system where the transfer roller is longer than the conditioning system and because of the length, diameter and speed of this element a center support member with a bearing attached is needed to support this element relative to the cutter bar to reduce flex.

The support member must be attached to the cutter bar which is also flexible with the result that the connection in the middle moves relative to the ends so that the design must accommodate this flexibility.

The arrangement shown in the above patent has a long rigid shaft which couples the two parts together with the bearing in the center. This shaft needs to flex as the center of the roller moves relative to the ends. If the roller is assembled with too much misalignment, or a deflection in the center occurs that causes bending of the shaft beyond its yield point so that it takes on a permanent bend, then the shaft will in too short a time fails from fatigue.

SUMMARY OF THE INVENTION

It is one object of the invention to provide a crop harvesting header of the type having a series of rotary cutting disks on a cutter bar where the transfer roller is supported one or more intermediate support members.

According to a first aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about an axis of the disk causes a standing crop to be cut by the blade as the blade rotates around the axis on the disk;

the header frame defining a discharge opening behind the cutter bar into which the cut crop enters so that the crop is discharged behind the discharge opening for forming a swath behind the header;

the discharge opening having ends which are spaced inwardly from ends of the cutter bar so that the discharge opening is narrower than the cutter bar;

the cutter bar having at each end of the cutter bar at least one outer cutter disk of the plurality of cutter disks, at least part of which is located outwardly of a respective end of the discharge opening;

a common rotary member extending across the discharge opening and arranged to rotate about a longitudinal axis of the common rotary member in a direction with a front face of the common rotary member turning upwardly and rearwardly;

the common rotary member having, at a position located part way along the common rotary member, a support coupling member connected between the common rotary member and the cutter bar and including bearing for allowing rotation of the common rotary member relative to the cutter bar;

the common rotary member comprising a first portion and a second portion coaxial with the first portion and connected at the support coupling member for common rotation;

the support coupling member comprising:

a mounting member attached to the cutter bar;

a bearing connected between the mounting member and an end of the first portion;

a universal joint connected between the end of the first portion and an adjacent end of the second portion;

such that loads from the adjacent end of the second portion are supported relative to the cutter bar through the universal joint, the bearing and the mounting member.

Preferably a single support coupling member is located at the center of the common rotary member but in some cases more than one such member may be provided at axially spaced locations.

Preferably the bearing includes a spherical surface which allows twisting of an axis of the end of the first portion relative to the mounting member and therefore relative to the cutter bar.

Preferably the common rotary member includes a cylindrical wall, defining a tube of the member on which auger flight elements can be carried at least adjacent the ends. That is the first portion of the common rotary member includes a first part of the cylindrical wall and the second portion of the common rotary member includes a second part of the cylindrical wall at a common diameter with the first part. Preferably the first portion defines a first shaft coaxial with the first part of the cylindrical wall where the shaft is carried by the bearing.

Preferably the bearing has an inner bearing element which is carried on the shaft and includes a spherical surface between the inner bearing element of the bearing and the mounting member which allows twisting of an axis of the end of the first portion of the common rotary member relative to the mounting member.

Preferably the first part of the cylindrical wall has an end edge at the bearing so as to provide a cover for the bearing.

Preferably the universal joint has a first member attached to the shaft of the first portion of the common rotary member and a second member attached to the adjacent end of the second portion of the common rotary member with a universal coupling between the first member and the second member. It will be appreciated that the universal joint can be arranged in either orientation with a shaft coupling attached either to the driven or non-driven portion of the common rotary member and a disk coupling to the other of the portions. Different arrangements of universal joint can also be used where the parts of the joint connect to the associated portions in different ways.

Preferably the second shaft at the end of the second portion of the common rotary member is fixed relative to the second part of the cylindrical wall of the second portion of the common rotary member.

Preferably the second part of the cylindrical wall of the second portion is spaced axially from the first part of the cylindrical wall of the first portion and there is provided a cylindrical cover member attached to the second part of the cylindrical wall of the second portion to surround the universal joint.

Preferably the mounting member comprises a disk which surrounds the bearing and lies in a radial plane of the axis of the bearing with an outer edge of the disk attached to the cutter bar.

The common rotary member is typically driven from one end only and this may be the portion with the shaft coupling to the universal joint or may be the other portion.

This arrangement of the common rotary member is typically used in a system in which the common rotary member at each end of the cutter bar carries a respective crop converging auger arranged to receive crop cut by the cutter disks at the respective end of the cutter bar and arranged to move the crop inwardly toward the discharge opening. Preferably each auger element is arranged generally longitudinal of the cutter bar with an outer end thereof spaced outwardly of the respective end of the discharge opening so as to carry the cut crop longitudinally of the cutter bar behind the cutter disks to the discharge opening.

BRIEF DESCRIPTION OF THE DRAWINGS

In the drawings like characters of reference indicate corresponding parts in the different figures.

DETAILED DESCRIPTION

Figure 1:
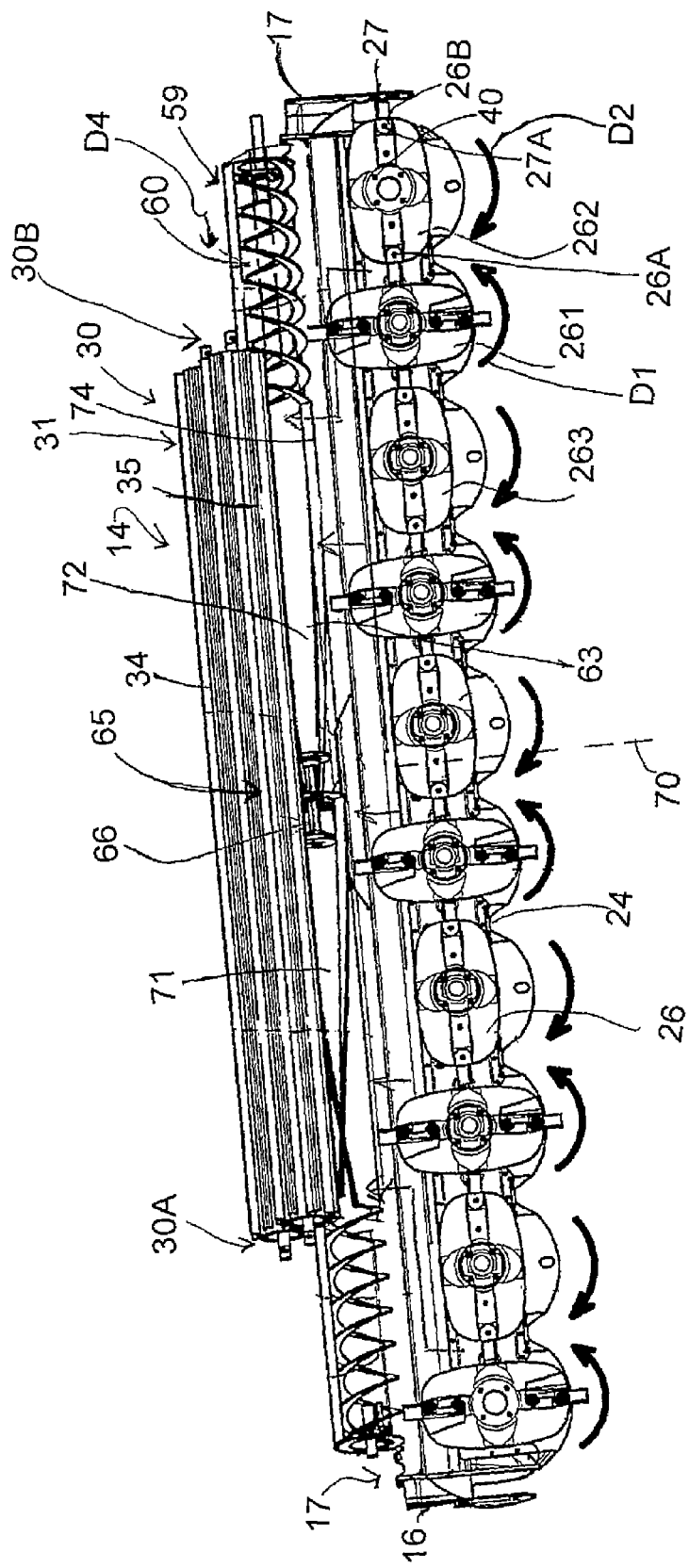
FIG. 1 is an isometric view from the top of a header of a type with which the present invention is concerned the present invention and taken from FIG. 8 of U.S. Pat. No. 8,069,640 above, the disclosure of which is incorporated by reference to show details of the present invention otherwise not described.

In FIG. 1 is shown schematically a header for attachment to conventional swather tractor of the well known type having driven ground wheels and rear castor wheels.

An alternative arrangement can be of the pull-type for towing behind a tractor and the construction of the hitch and support wheels of such a device is well known to a person skilled in this art.

A front support assembly of the tractor carries the header 14 including left and right lift arms which carry the header in a floating action across the ground along skid plates (not shown) of the header. The header includes side walls 15 and 16 forming part of a frame 17 attached to the conventional transport system of the tractor. The frame carries top covers (not shown) which support a front skirt in front of the cutter bar.

The frame 17 includes a main transverse beam which is attached to the tractor. The main beam carries the side walls 15 and 16 so as to confine crop material to the interior of the header between the side walls for cutting action effected by a cutter bar 24 carried at ends on the frame 17.

Within the cutter bar 24 is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape so that a length between two ends is significantly greater than a distance between the side edges in a direction at right angles to the length. At each of the ends 26A and 26B is mounted a respective one of a pair of flails 27 each for pivotal movement about a flail mounting pin 27A. The mounting pins are arranged at the ends and thus at the maximum extent of the disk so that the flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

The cutter bar of this general construction is of a conventional nature and many examples of a commercial arrangement of this type are available in the market place. Thus the details of the cutter bar and its mounting are well known to one skilled in the art and further details can be obtained from such commercial devices.

The cutter bar 24 is wider than a discharge opening 30 with an entrance mouth having ends 30A and 30B defined in a back sheet (not shown) forming a vertical rear panel of the header behind the cutter bar. A conditioning system 31 is mounted in the discharge opening 30. Thus the crop material passes over and between the disks when cut and also must be converged from the full cut width into the entrance mouth of the discharge opening 30.

The discharge opening 30 has side walls (not shown) which are vertical and parallel and extend rearwardly from the mouth and which confine the crop material to pass through the discharge opening over a width less than the width of the header so that the side walls are spaced inwardly from the respective end walls 15 and 16 of the header.

The crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement so that the crop material passing through the discharge opening passes through a nip 37 between the conditioning rolls and is discharged from the rear of the conditioning system as a swath of material to be discharged onto the ground or to be collected as required.

The disks 26 mounted on the cutter bar 24 include a series of disks which are located in front of the discharge opening 30. Outward of these disks and either side is provided a pair of outer disks indicated at 261 and 262 with the disk 262 outermost. These disks are arranged to rotate inwardly as indicated by arrows D so that the front extremity and the blade carried thereby rotates in the direction indicated at the arrows D1, D2 to carry the crop material which is cut by those disks between the disks.

The disk 262 carries an impeller 40 mounted on the disk so as to be carried thereby and driven thereby and so as to be directly co-axial with the disk 262. A hanging impeller (not shown) can be used to replace this impeller also co-axially arranged with the corresponding disk 262 or the axis of the impeller may be offset from the axis of the disk. It will be appreciated that the disk and the impeller co-operate to assist in carrying the crop material inwardly toward the discharge opening and to resist the crop material from moving rearwardly over the disks 262 to the rear bulkhead panel which could cause collection of the crop material and eventual blockage of the system.

The top conditioning roller 34 is located above the bottom conditioning roller 35. These define between them the nip 37 through which the crop material is controlled to pass. The top conditioning roll 34 and the bottom conditioning roll 35 are parallel and arranged such that the crop passes through the nip 37 between the top and bottom conditioning rolls. The top and bottom conditioning rolls are arranged such that the nip 37 is raised above the common cutting plane P and is located behind the disks 26. The top and bottom conditioning rolls 34, 35 each comprising a cylindrical body 77, mounted for rotation about an axis 78, 79 thereof. In one example, on the cylindrical body 77 is mounted a series of longitudinally extending, angularly spaced flutes 36 arranged such that the flutes 36 of the top roll 34 mesh with the flutes of the bottom roll 35 in the conditioning action, as is well known.

However the present invention is also applicable to conditioning rolls of the type which have no flutes or ribs so that the conditioning action is effected by a high crushing force between two plain rollers. The rollers can be smooth or may include grooves or indentations which are not intended to mesh in the crushing action. Crushing conditioner rolls of this type are well known to persons skilled in this art and different designs may be selected and used as will be known to such persons.

In addition the present invention can be used in an arrangement in which the conditioning rollers are omitted so that no conditioning occurs in the discharge opening.

In a ten or twelve disk mower, in front of the discharge opening there are located eight of the cutter disks arranged in four pairs of disks with each pair arranged to rotate in opposite directions such that the crop tends to pass between the pair of disks.

Narrower machines of the type typically used in Europe or other countries where smaller machines are more suitable may have only three pairs of disks in front of the discharge opening.

The pairs of the cutter disks in front of the discharge opening include a first end disk 261 located in line with the first end wall 32 of the discharge opening and a second end disk (at the opposite end not illustrated) located in line with the second end of the discharge opening. That is an imaginary line extending forwardly from the end 30B intersects the disk 261. This is typically located at a position thereon spaced inwardly from its axis but can be outside the axis of the disk 261. The axis and main body of the end disks 261 are mounted outboard of the imaginary line of the opening so that the next adjacent disks define a cutting circle which is closely adjacent or at the line. Thus the majority of the end disks 261 are outboard of the respective line.

The end disk is arranged to rotate so that a front of the first disk 261 moves outwardly of the respective end of the discharge opening as marked at direction arrow D1. A first outer disk 262, which is mounted outwardly of the end line of the discharge opening and outwardly of the end disk rotates in the opposite direction to the disk 261 as indicated at D2. A third disk 263 inward of the disk 261 rotates in a direction opposite to the disk 261 so as to form a pair with the disk 261 such that at least some of the crop tends to be swept into a first zone between the first pair of disks 261, 262 and to pass through that zone.

A crop converging structure 59 is located behind the disks 261 and 262 and tends to move the crop inwardly toward the discharge opening 30. The crop converging structure 59 comprises an auger element 60.

The end disk 262 is located immediately adjacent the end wall 16, 17 of the header. The end wall is connected to a connecting wall which is curved around the path of the cutting blade 27 of the end disk 262 so as to extend inwardly and rearwardly from the end wall 16 to a recessed end wall spaced inwardly from the end wall 16. Thus the wall is located at a position spaced inwardly from the end of the header. Behind the end wall is provided the rear bulkhead which extends inwardly at right angles to the end wall up to the entrance mouth of the discharge opening 30. The rear wall is spaced rearwardly from the rear edges of the path of travel of the cutting blades by a distance equal to the length of the recessed end wall 62. This provides a region for the auger element 60 which acts as a converging member for converging the crop behind the end cutters 261 and 262.

Figure 2:
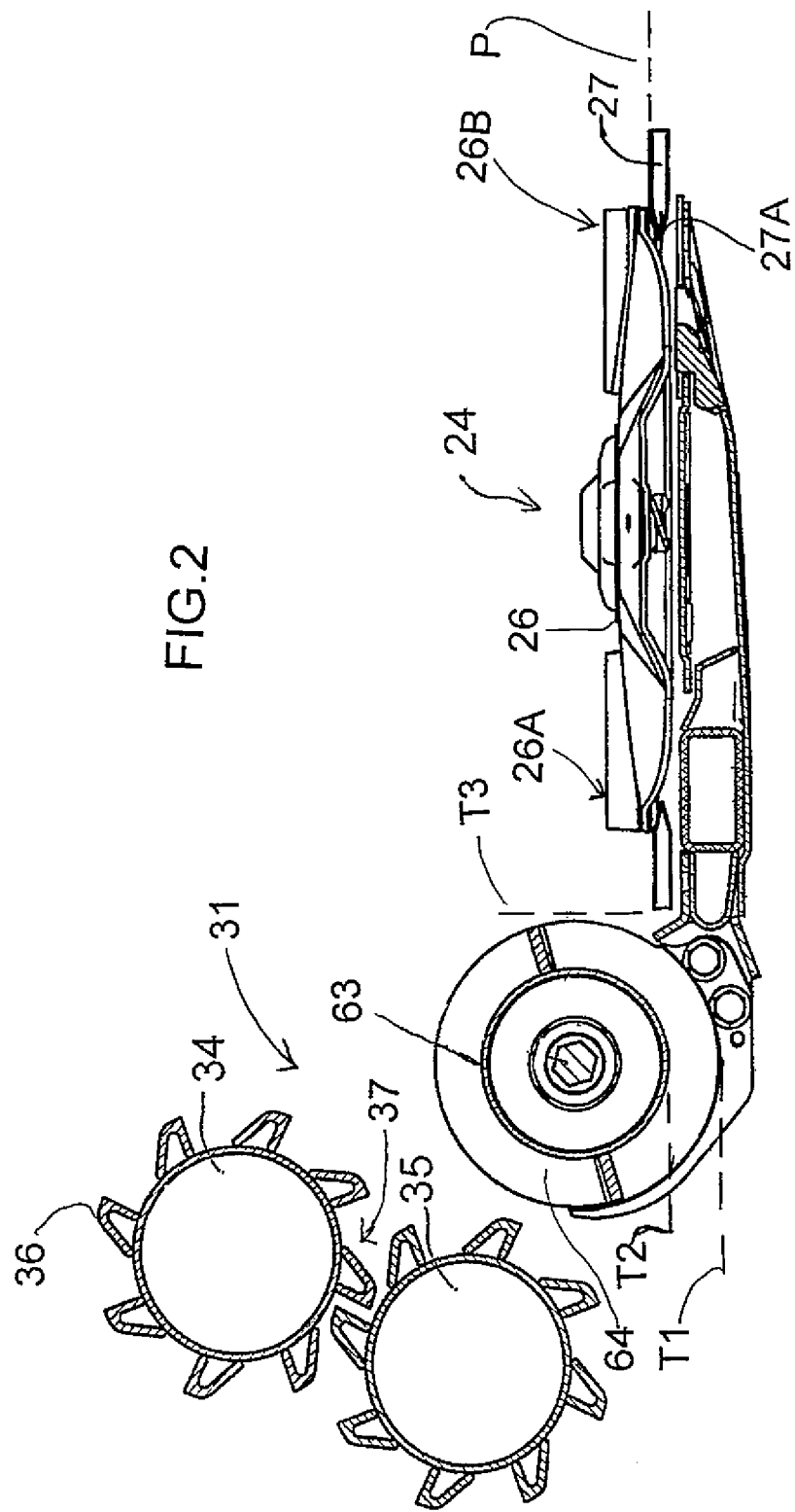
FIG. 2 is a cross sectional view along the lines 2-2 of FIG. 1 which is taken from FIG. 10 of the above patent.
Figure 3:
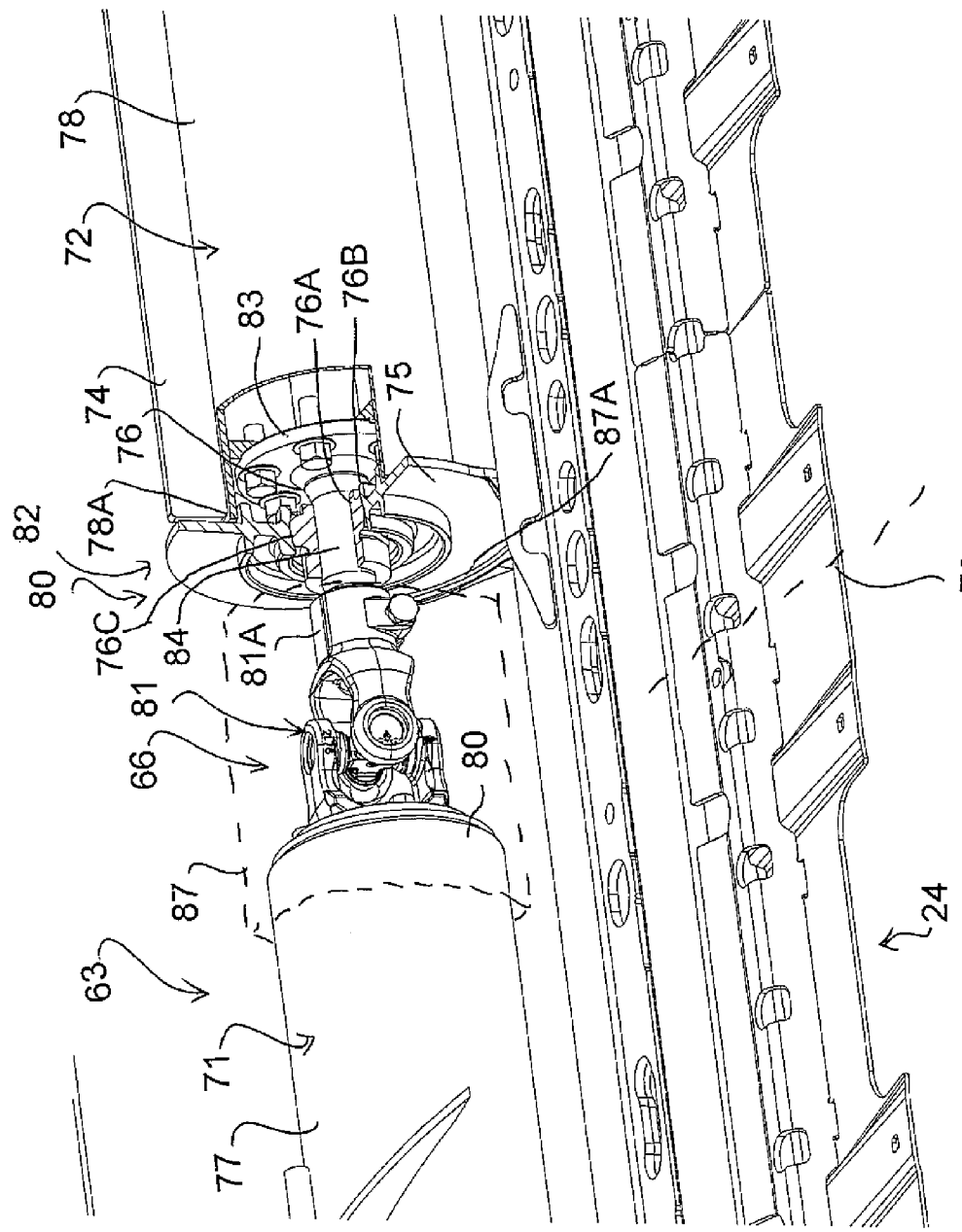
FIG. 3 are is an isometric views of the center support for the transfer roller in an embodiment according to the present invention.
Figure 4:
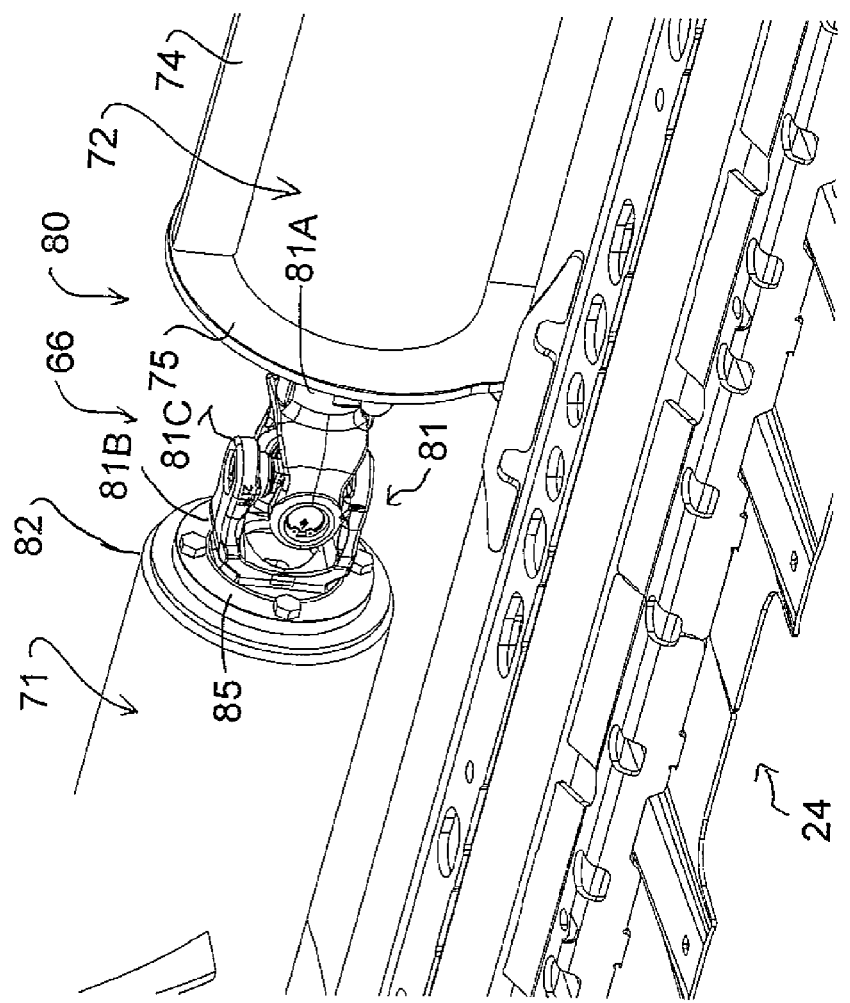
FIG. 4 is an isometric views of the center support for the transfer roller in an embodiment according to the present invention.

The auger element 60 comprises an auger tube 63 and an auger flight 64 carried on the tube. In the embodiment of FIGS. 2, 3 and 4, the auger flight 64 is a single auger flight shaped such that rotation of the auger tube in the direction D4 acts to lift the crop upwardly and over the auger element as an overshot auger while at the same time the helical angle of the flight 64 acts to carry the crop on top of the auger tube inwardly toward the discharge opening 30.

The rear wall behind the auger element includes an upper part which curves upwardly and forwardly to connect to a top wall of the header construction which extends over the cutting area and over the cutter bar 24. Also the rear wall underneath the auger 60 curves forwardly in a part cylindrical shape as indicated at so as to wrap around the outer edge of the periphery of the flight 64. This portion thus forms a pan underneath the auger and extending to a forward edge which is located just behind the rear tip of the blade 27. Thus the upper part of the auger and the front of the auger are exposed to the crop and the pan extends only to the rear and underneath.

The auger flight 64 has smooth outer edges so that it provides no cutting or grasping action on the crop allowing the auger flight to merely act as a transfer member carrying the crop inwardly as the helical flight rotates.

Typically the diameter of the tube 63 can lie in the range 100 to 200 mm. The height of the auger flight lies in the range 25 to 50 mm. In a typical example therefore the tube is of 150 mm diameter and the flight is of 40 mm height. The tangent at the bottom of the flight as indicated at T1 is located at a height slightly below the cutting plane P that is the bottom edge of the blade. However this position may be slightly raised so that it is located directly at the cutting plane defined by the sharpened edge or it may be even slightly above that cutting plane. The bottom tangent T2 of the tube is above the cutting plane. The forwardmost tangent T3 of the flight is located substantially at the rear edge of the blade 27.

The tube 63 extends along the header from a first end at the end wall 16 to a second end at the end wall 17 Bearings (not shown) for the auger tube 63 are arranged at the ends.

The auger flight 64 is arranged so that it causes movement of the crop engaging the tube 63 in the direction of the arrow D4. The flight section 74 in a central area aligned with the opening 30 is arranged at a very shallow helical angle so as to provide little or no transverse movement in this area so that it can act as a feeding flange acting to engage the crop and tending to assist the movement of the crop into the discharge opening and into the nip 37 between the conditioning rollers. The flight section 74 can be replaced by axial bars having no helical effect.

The location of the end of the auger element or transfer roller at a position spaced inwardly from the end wall 16 allows the positioning of the drive elements and bearings well within the extent of the frame as defined by the end wall 16. This area therefore provides space for the drive elements without the necessity for these elements projecting beyond the end wall 16. The transfer of the crop material to the discharge opening 30 is effected by a co-operation between the rotation directions of the cutting disks 261 and 262 together with the operating action of the impeller 40 and also the transfer action of the auger element itself. The auger element is located in front of the conditioning rollers so that the auger element can extend to a position where the flight 64 is located directly in front of the conditioning rollers allowing the crop material to turn at an angle significantly less than 90° to enter the nip 37 between the conditioning rollers. Thus there are no sharp turns involved in the movement of the crop as it is transferred from the area behind the disks 261 and 262 into the area of the nip 37.

A stripper member is mounted on the rear wall at positions outwardly of the entrance mouth and projects forwardly from the rear wall so as to provide a forwardmost edge in contact with or immediately adjacent the outer periphery of the flight as the flight rotates. The stripper member thus provides a surface which prevents crop from entering the area between the auger flight and the pan. This arrangement therefore helps in preventing any wrapping of the crop around the auger elements and particularly the auger tube. The auger flight 64 terminates at the end which is located just inside the mouth 30A. However the auger flight 64 can extend to a position closely adjacent the middle of the header that is midway across the conditioning rollers. In this area the auger flight acts to assist in spreading the material from the area outside the discharge opening, across the discharge opening so as to tend to even out the crop material across the width of the discharge opening.

In FIG. 1 is shown a rotation pattern of a 10 disk machine arranged in pairs with each pair rotating toward one another so as to form streams where each stream includes the material from two disks. This again balances the material cross the conditioner 31.

The roller 63 of the common rotary member is divided at or adjacent a center line 70 into two separate roller portions 71 and 72 on respective sides of the center line which are coaxial and mounted and connected for common rotary movement about the common longitudinal axis. The portions 71 and 72 each have a coaxial cylindrical wall 77 and 78 for carrying the bars and/or flights 74 of the common rotary member.

This allows a bearing assembly 66 to be provided at the center line 70 which acts to provide support for the center of the rotary member 63 from the cutter bar. The bearing assembly 66 forms the subject of the present invention and is shown in more detail in FIG. 3. Thus load from the center of the common auger member 66 is transferred to the cutter bar 24 and is carried thereby to reduce flexing of the roller 63.

The bearing 66 includes a center support member in the form of a plate or disk 75 attached at the bottom to the cutter bar 24 and a bearing 76. Suitable mounting brackets can be provided depending on the construction and shape of the cutter bar 24.

As the crop passes over the roller 63 in the central area at the center line 70, the presence of the support plate 75 and the bearing 76 does not significantly interfere with the passage of the crop. The bearing 76 is desirable in some cases where the common auger member is greater than a certain length where unacceptable flexing will occur. If required, more than one bearing can be used at spaced positions along the member 63 so that the load is transferred to the cutter bar structure 24 at locations other than the center.

The common rotary member has therefore the support coupling member 66 including the bearing 76 for allowing rotation of the common rotary member 63 relative to the cutter bar. The support coupling member includes the mounting member attached to the cutter bar in the form of the disk 75 lying in a radial plane of the axis of the roller. The bearing 76 is connected between the mounting member or disk 75 and an adjacent end 80 of the first portion 72 of the roller. This acts to support the end 80 relative to the disk 75 and to the cutter bar so that the portion 72 is carried at its outer end on an outer bearing (not shown) and at its inner end on the bearing 76. The length of the portion 72 is such that only acceptable flexing can occur between these bearings.

A universal joint 81 is connected between the end 80 of the first portion 72 and an adjacent end 82 of the second portion 71. In this way loads from the adjacent end 82 of the second portion 71 are supported relative to the cutter bar through the universal joint 81, the bearing 76 and the mounting member 75. There is no bearing for the end 82 and no support for the end 82 apart from the above connection. In this way both portions are supported on the same support disk and only one bearing is provided. Flexing movement will occur between the end 82 and the end 80 and is taken up by movement within the universal joint 81.

The first portion 72 defines a first stub shaft 84 coaxial with the first part 78 of the cylindrical wall and attached thereto by a support bracket 83. Thus the stub shaft 84 is carried by the bearing 76. The bearing 76 includes an inner bearing element 76A which is carried on the shaft 84 and an outer bearing element 76B with ball or roller bearing between the two elements. A spherical coupling or surface 76C is provided between the bearing element 76B of the bearing 76 and the mounting disk 75 which allows twisting of an axis of the end 80 of the first portion of the common rotary member relative to the mounting disk 75. In this way flexing of the cutter bar which causes up and down movement of the disk 75 is taken up relative to the end 80 of the portion 72 in the spherical bearing surface 76C without ending of the shaft or other element.

The first part 78 of the cylindrical wall has an end edge 78A at the bearing and closely adjacent the side of the disk 75 so as to provide a cover for one side of the bearing. The second part 77 of the cylindrical wall of the second portion 71 is spaced axially from the first part 78 of the cylindrical wall of the first portion and there is provided a cylindrical cover member 87 attached to the second part of the cylindrical wall of the second portion to surround the universal joint with an outer edge 87A of the cover 87 immediately adjacent the disk 5.

The universal joint 81 is of a conventional commercially available construction with a first member 81A attached to the first portion 72 and a second member 81B attached to the second portion 71 with a universal coupling 81C between the first member and the second member.

Typically such universal joints include an arrangement in which the member 81A attaches to a shaft and the second member attaches to an end disk. Thus in this case the member 81A attaches to the shaft 84 at the end of the portion 72 and the member 81B attaches to an end disk 85 (FIG. 4) of the portion 72. However this arrangement may be reversed and the portion 17 may be provided with a mounting shaft. In addition other arrangements of universal coupling may be provided where the mounting of the members may be different.

The disk 85 at the end of the second portion 71 is fixed relative to the second part of the cylindrical wall of the second portion and has no flexible connection therebetween as all the necessary flexing action at the end of the portion 71 is provided at the universal joint which is designed to accommodate this.

The design provides an arrangement which allows for more flexibility at the joint by providing the universal joint which is placed at the center of the auger roller so that the center of the auger roller can pivot.

The side of the auger roller connected to a single input drive arrangement is the portion 72 at the outer end of the portion 72. The portion 72 thus has the male stub shaft 84 thereon at the inner end and is supported by two bearings including one (not shown) at the driven outer end and the bearing 76 at the center. The flexible joint 81 couples between the male stub shaft 84 at the center of the first portion 72 of the auger roller and the second part 71 of the auger roller. The universal joint 81 is covered by the cylindrical cover shield 87 which is formed of two parts each half cylindrical and connected around the end of the portion 71.

The invention claimed is:

1. A crop harvesting header comprising:
    a header frame arranged to be transported across ground on which there is a standing crop for harvesting;
    a cutter bar mounted on the header frame across a width of the header for movement across the ground for harvesting the standing crop;
    a plurality of generally horizontal cutter disks mounted on the cutter bar at positions spaced transversely of the header with the disks being mounted on the cutter bar for driven rotation about respective generally upright axes spaced along the cutter bar;
    each disk having mounted thereon at a position spaced outwardly from the respective axis thereof at least one cutter blade such that rotation of the disk about an axis of the disk causes a standing crop to be cut by the blade as the blade rotates around the axis on the disk;
    the header frame defining a discharge opening behind the cutter bar into which the cut crop enters so that the crop is discharged behind the discharge opening for forming a swath behind the header;
    the discharge opening having ends which are spaced inwardly from ends of the cutter bar so that the discharge opening is narrower than the cutter bar;
    the cutter bar having at each end of the cutter bar at least one outer cutter disk of the plurality of cutter disks, at least part of which is located outwardly of a respective end of the discharge opening;
    a common rotary member extending across the discharge opening and arranged to rotate about a longitudinal axis of the common rotary member in a direction with a front face of the common rotary member turning upwardly and rearwardly;
    the common rotary member having, at a position located part way along the common rotary member, a support coupling member connected between the common rotary member and the cutter bar and including a bearing for allowing rotation of the common rotary member relative to the cutter bar;
    the common rotary member comprising a first portion and a second portion coaxial with the first portion and connected at the support coupling member for common rotation;
    the support coupling member comprising:
        a mounting member attached to the cutter bar;
        a bearing connected between the mounting member and an end of the first portion, the bearing having an outer bearing element fixed to the mounting member and an inner bearing element fixed to said end of the first portion;
        such that loads from said end of the first portion are supported by the cutter bar directly through the bearing and the mounting member;
        and;
        a universal joint connected between the end of the first portion and an adjacent end of the second portion;
        such that loads from the adjacent end of the second portion are supported relative to the cutter bar through the universal joint, the bearing and the mounting member.

2. The harvesting header according to claim 1 wherein the bearing includes a spherical surface which allows twisting of an axis of the end of the first portion relative to the mounting member.

3. The harvesting header according to claim 1 wherein the common rotary member includes a cylindrical wall such that the first portion includes a first part of the cylindrical wall and the second portion includes a second part of the cylindrical wall at a common diameter with the first part, wherein the first portion defines a first shaft coaxial with the first part of the cylindrical wall and wherein the shaft is carried by the bearing.

4. The harvesting header according to claim 3 wherein the inner bearing element is carried on the shaft and includes a spherical surface between a bearing element portion of the bearing and the mounting member which allows twisting of an axis of the end of the first portion of the common rotary member relative to the mounting member.

5. The harvesting header according to claim 3 wherein the first part of the cylindrical wall has an end edge at the bearing so as to provide a cover for the bearing.

6. The harvesting header according to claim 3 wherein the universal joint has a first member attached to the first shaft of the first portion and a second member attached to an adjacent end of the second portion with a universal coupling between the first member and the second member.

7. The harvesting header according to claim 6 wherein the second portion includes an end disk attached to the second member which is fixed relative to the second part of the cylindrical wall of the second portion.

8. The harvesting header according to claim 3 wherein the second part of the cylindrical wall of the second portion is spaced axially from the first part of the cylindrical wall of the first portion and wherein there is provided a cylindrical cover member attached to the second part of the cylindrical wall of the second portion to surround the universal joint.

9. The harvesting header according to claim 1 wherein the mounting member comprises a disk which surrounds the bearing and lies in a radial plane of the axis of the bearing.

10. The harvesting header according to claim 1 wherein at each end of the cutter bar the common rotary member carries a respective crop converging auger element arranged to receive crop cut by the cutter disks at the respective end of the cutter bar and arranged to move the crop inwardly toward the discharge opening.

11. The harvesting header according to claim 10 wherein each auger element is arranged generally longitudinal of the cutter bar with an outer end thereof spaced outwardly of the respective end of the discharge opening so as to carry the cut crop longitudinally of the cutter bar behind the cutter disks to the discharge opening.

12. The harvesting header according to claim 1 wherein the common rotary member is driven from one end only.

* * * * *